(No Model.) 3 Sheets—Sheet 2.
G. P. CONANT.
DRAWING OR CUTTING TABLE.
No. 450,735. Patented Apr. 21, 1891.
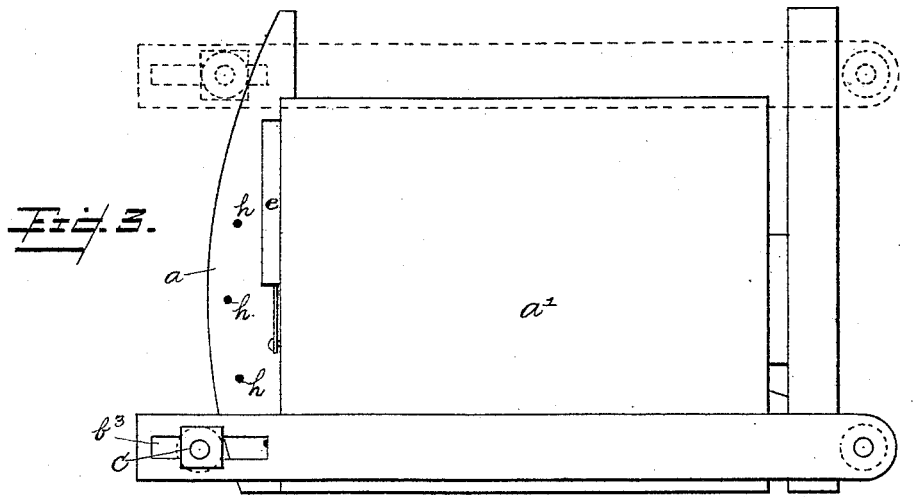
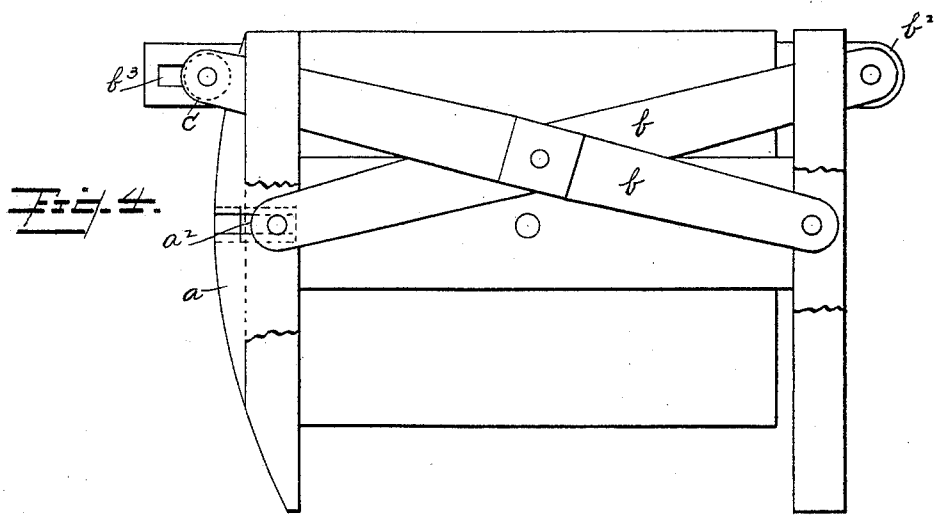
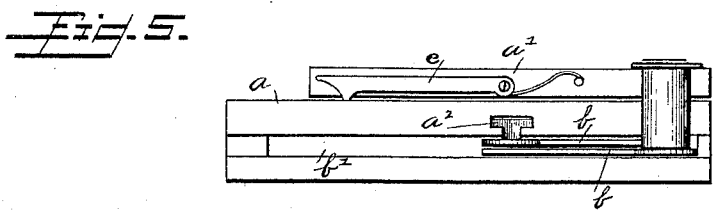
Witnesses
Jos H Blackwood
Albert B Blackwood
Inventor
George P Conant
by Wm H Doolittle
Attorney (No Model.) 3 Sheets—Sheet 3.
G. P. CONANT.
DRAWING OR CUTTING TABLE.
No. 450,735. Patented Apr. 21, 1891.
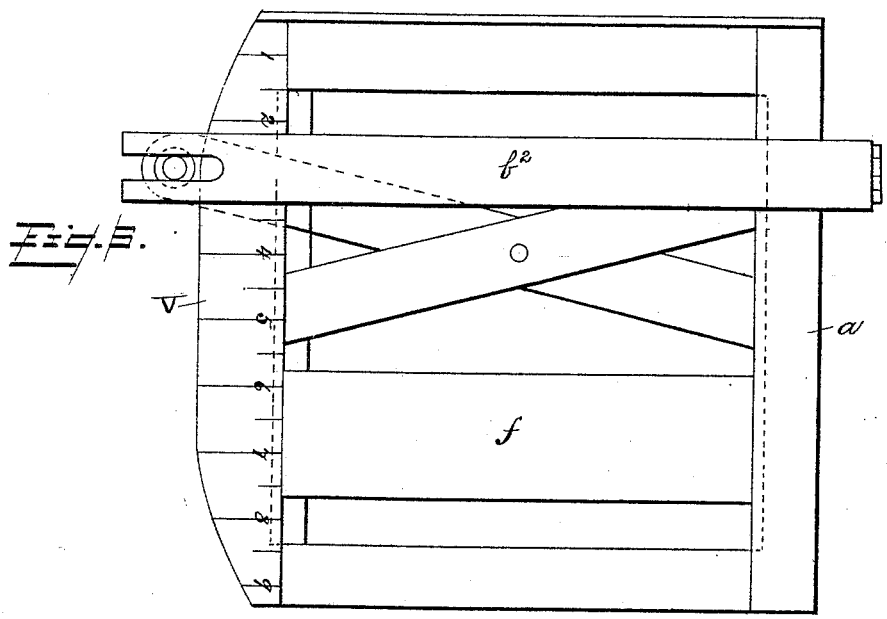
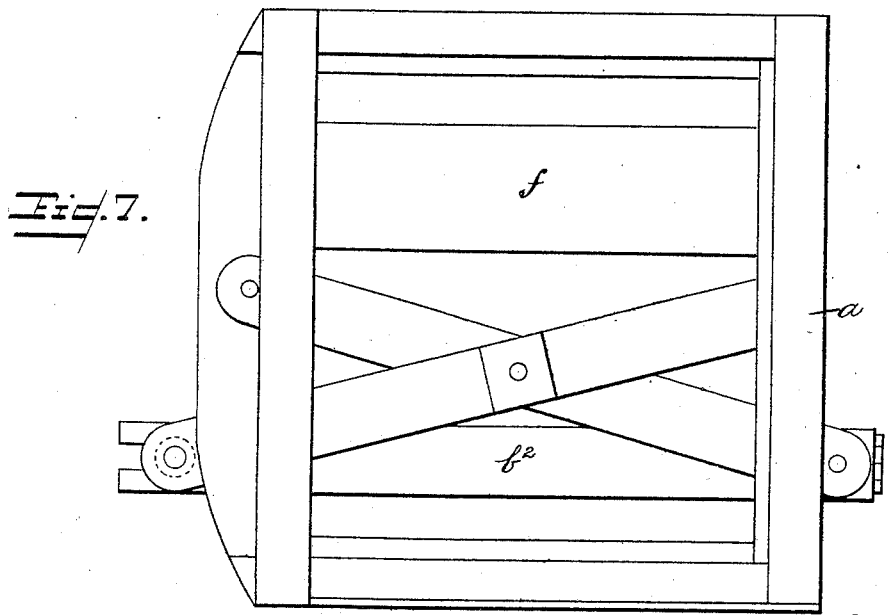
Witnesses
Jos. H. Blackwood
Albert B. Blackwood
Inventor
George P. Conant
by Wm. H. Doolittle
Attorney
THE NORRIS PETERS CO., PHOTO-LITHO., WASHINGTON, D. C.

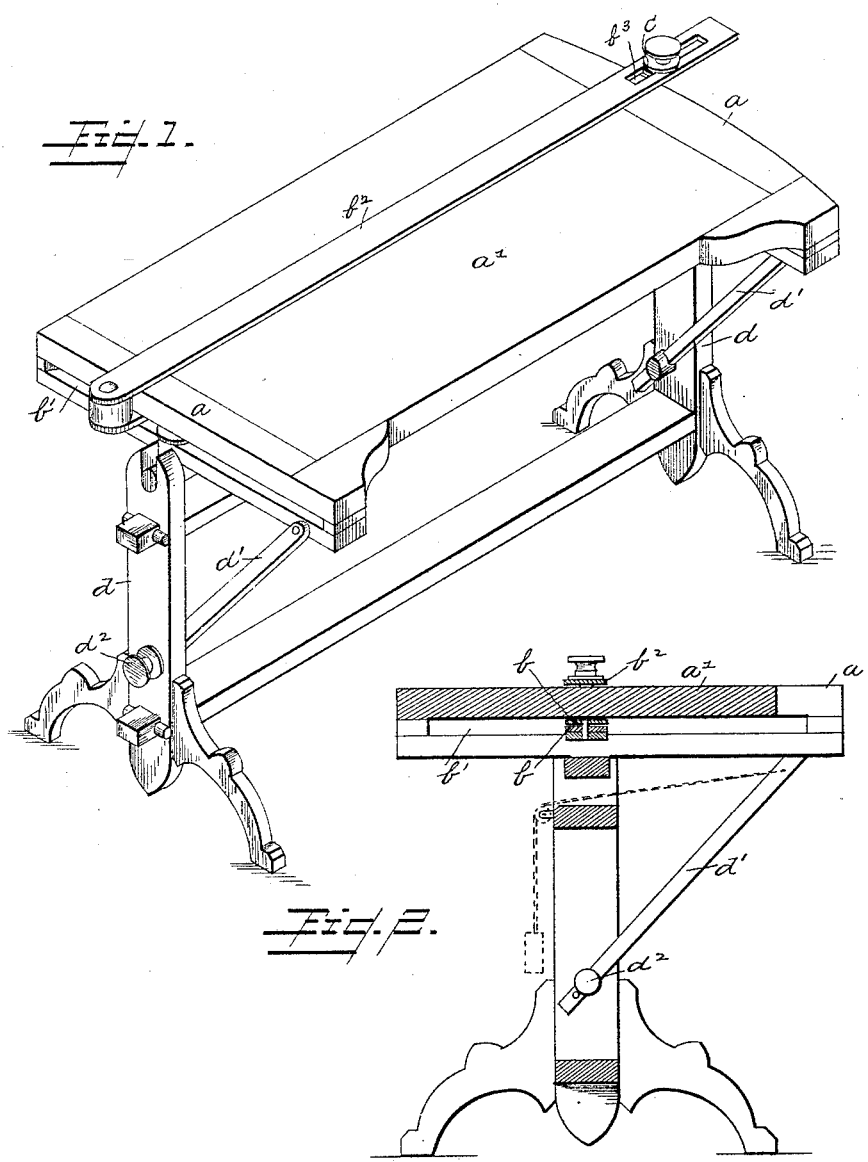

UNITED STATES PATENT OFFICE.

GEORGE PUTMAN CONANT, OF GENEVA LAKE, WISCONSIN.

DRAWING OR CUTTING TABLE.

SPECIFICATION forming part of Letters Patent No. 450,735, dated April 21, 1891.

Application filed January 8, 1890. Serial No. 336,222. (No model.)

*To all whom it may concern:*

Be it known that I, GEORGE PUTMAN CONANT, a citizen of the United States, residing at Geneva Lake, in the county of Walworth and State of Wisconsin, have invented certain new and useful Improvements in Drawing or Cutting Tables; and I do hereby declare the following to be a full, clear, and exact description of the invention, such as will enable others skilled in the art to which it appertains to make and use the same.

This invention relates to improvements in drawing or cutting tables; and it consists in certain peculiarities of the construction and arrangement of the same, substantially as will be hereinafter more fully set forth and claimed.

My invention is illustrated in the accompanying drawings, in which—

Figure 1 is a perspective view of a drawing or cutting table fitted with my device. Fig. 2 is a vertical cross-section of the same. Fig. 3 is a top plan view of a smaller drawing or cutting board also so fitted. Fig. 4 is a bottom view of the same. Fig. 5 is an end elevation. Fig. 6 is a top plan, and Fig. 7 is a bottom view, of a frame of similar nature suitable for its several uses.

The object I have in view is to combine with a drawing or cutting board or table an adjustable ruler, which, readily moved to any convenient point upon the board or table, is so connected as to be always parallel to adjustment line, and can by no possibility get out of proper shape or position, and I accomplish this as will be now described.

$a$ represents the frame of my drawing or cutting board or table, which may be made in any manner and of any material found most suitable. Thus in Fig. 1 the drawing or cutting board forms the table-top, and is secured flush with the upper surface of the frame, while in Fig. 3 the drawing or cutting board $a'$ is raised above the frame $a$ and pivoted thereon, so that it may be adjusted to any angle.

In the under side of the frame $a$ are two arms $b\ b$, pivoted together at their centers, as shown. One end of each of these arms is pivoted upon the frame and the other end of each is extended through the guide-slots $b'$ in the frame and connected to the end of a ruler $b^2$, which lies across the board $a'$, as in the drawings. It will be noted in this connection that while one of the arms $b$ is pivoted directly to the frame $a$ the other is pivoted upon a slide $a^2$ in said frame, as will be more clearly seen in Figs. 4 and 5, and by this arrangement one of the connections with the ruler always bears firmly against the square end of the frame, while the other end of the ruler is connected to the pivoted arms by a slide $c$, working in a slot $b^3$ in the ruler, as this connection describes a curve in its movement from one side of the board to the other, and the ruler is thereby always held in parallel positions, no matter where it may be moved across the face of the board.

In Figs. 1 and 2 I have shown this device fitted to a drawing or cutting table and the frame $a$ pivoted in suitable legs $d$ and provided with adjustable braces $d'$ and clamping-nuts $d^2$ for the same, in order that the table-top may be given any angle desired by the workman.

In Figs. 3, 4, and 5 is shown a smaller device in which the drawing or cutting board is pivoted upon the frame $a$ and provided with a spring-latch $e$ to engage any one of a series of holes $h$ in said frame, and I am thus readily enabled to turn the board beneath the ruler and obtain any desired angle, the ruler not being in any way disturbed and working just as before described. This facilitates drafting where surveying directions are indicated as so many degrees east or west of a given meridian.

In Figs. 6 and 7 I have shown a frame $a$ and ruler $b^2$ constructed just as previously described; but instead of a large drawing or cutting board I have provided a supporting-piece $f$, sliding in the frame $a$, and which is slid along as the ruler is moved, so as always to be beneath it. This device is particularly adapted for the cutting of glass, as the ruler cannot get out of proper relation to the frame, and the glass must always be cut exactly square. V (shown in Fig. 6) is a graduated scale formed on one of the stationary side pieces of the frame $a$, whereby the adjustment of slide $f$ or the ruler can be measured.

In ordinary drafting a T-square is used, the blade of which lies across the drawing and angles worked against it for lines at an angle to the blade; but the blade is not held rigid and often is accidentally moved at one end and the drawing is injured. With my device the ruler takes the place of the T-square and is held by the pivoted arms so that one end cannot be moved without the other, and it cannot accidentally get out of true. At the same time it is easily moved across the board to any desired position and lies firmly wherever placed. The thumb-screw shown at one end may be screwed down to clamp the blade, so that it may be firm in one place when it is desirable to use it for some time without a change.

In Fig. 2 I have shown in dotted lines a weighted cord secured to the pivoted arms and passed over a pulley on the frame. This serves to just balance the weight of the ruler and enable it to be more readily used upon the table when the latter is set at an incline, as will be readily understood.

It is obvious that my invention may be applied to a large number of uses, such as drafting, tabulating, glass-cutting, &c., and is not restricted to any particular application.

Having thus fully described my invention, what I claim is—

1. In a drawing or cutting table, the combination, with a ruler-blade crossing the table, of guide-arms also crossing the table and pivoted together at their centers beneath the ruler, with their opposite ends pivoted, respectively, to the table-frame and to the blade, substantially as and for the purposes described.

2. The combination, with the rocking frame of a drawing-table, of pivoted braces and set-screws for setting the frame at any desired angle, a drawing-board, a ruler-blade lying across the face of the board, a pair of guide-arms pivoted together beneath the board and having their opposite ends connected, respectively, to the frame and to the blade, and means to set the ruler in position on said board, substantially as and for the purposes described.

3. The combination, with the frame of a drawing or cutting board or table, of a board to receive the material to be operated on, pivoted upon the frame and provided with a latch to hold it in different positions, and a graduated scale with which said latch engages, whereby the board is readily turned and held at any desired angle, substantially as and for the purposes described.

4. The combination, with the frame of a drawing or cutting board or table formed with guide-slots in its ends, of a ruler-blade across the face of the table or board, and a pair of guide-arms for the same pivoted together, one of said arms having one end pivoted to the frame and the other connected with a slot in the blade, and the other arm pivoted to the opposite end of the blade and also to a slide in the frame, substantially as and for the purpose set forth.

In testimony whereof I affix my signature in presence of two witnesses.

GEORGE PUTMAN CONANT.

Witnesses:
C. C. KESTOL,
W. H. WILSON.